United States Patent
So et al.

(10) Patent No.: US 8,934,335 B2
(45) Date of Patent: Jan. 13, 2015

(54) SYSTEM AND METHOD FOR ENHANCING LOOP FREE ALTERNATIVE COVERAGE

(75) Inventors: Ning So, Plano, TX (US); William F. Copeland, Garland, TX (US); Fengman Xu, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 345 days.

(21) Appl. No.: 13/221,539

(22) Filed: Aug. 30, 2011

(65) Prior Publication Data

US 2013/0051217 A1    Feb. 28, 2013

(51) Int. Cl.
   *G06F 11/00*      (2006.01)
   *H04L 12/705*     (2013.01)
   *H04L 12/707*     (2013.01)
   *H04L 12/703*     (2013.01)
   *H04L 12/723*     (2013.01)

(52) U.S. Cl.
   CPC .............. *H04L 45/18* (2013.01); *H04L 45/22* (2013.01); *H04L 45/28* (2013.01); *H04L 45/50* (2013.01)
   USPC ............ 370/217; 370/222; 370/229; 370/419

(58) Field of Classification Search
   None
   See application file for complete search history.

(56) References Cited

U.S. PATENT DOCUMENTS

| | | | |
|---|---|---|---|
| 6,347,078 B1* | 2/2002 | Narvaez-Guarnieri et al. | 370/230 |
| 6,898,641 B1* | 5/2005 | Kobayashi | 709/238 |
| 7,373,845 B2* | 5/2008 | Kaijala | 73/862.391 |
| 7,801,031 B2* | 9/2010 | Chao et al. | 370/228 |
| 7,830,786 B2* | 11/2010 | Atlas et al. | 370/217 |
| 7,852,751 B2* | 12/2010 | Bryant et al. | 370/218 |
| 7,933,197 B2* | 4/2011 | Bryant et al. | 370/216 |
| 2005/0073958 A1* | 4/2005 | Atlas et al. | 370/238 |
| 2006/0187819 A1* | 8/2006 | Bryant et al. | 370/216 |
| 2007/0070909 A1* | 3/2007 | Reeve | 370/238 |
| 2008/0101259 A1* | 5/2008 | Bryant et al. | 370/254 |
| 2008/0304494 A1* | 12/2008 | Yokoyama | 370/400 |
| 2010/0157813 A1* | 6/2010 | Matsuura | 370/242 |
| 2011/0007629 A1* | 1/2011 | Atlas et al. | 370/225 |
| 2012/0051212 A1* | 3/2012 | Xu et al. | 370/223 |

* cited by examiner

*Primary Examiner* — Ian N Moore
*Assistant Examiner* — Latresa McCallum (57) ABSTRACT

An approach is provided for improving network restoration by enhancing loop free alternative coverage. A loop-free alternate (LFA) procedure is initiated for a failed link of a network including a plurality of nodes. A state of incomplete loop-free alternate coverage for the nodes is determined. A shortest path in the network exclusive of the nodes associated with the failed link is determined. Each node along the determined shortest path is set as an explicit route object to create a bypass label switched path for the network.

14 Claims, 8 Drawing Sheets

SYSTEM AND METHOD FOR ENHANCING LOOP FREE ALTERNATIVE COVERAGE

BACKGROUND INFORMATION

With the increase in demand for broadband communications and services, telecommunication service providers are in a constant state of flux to provide the fastest and most reliable service to their customers. Not surprisingly, a vast interconnection of data networks has emerged to support these services. Any disruption in the communication paths between network nodes (e.g., routers) can result in packet loss, latency, or delay, causing slow service as well as intermittent interruptions of service to customers. Hence, in modern data communication networks, the network restoration speed is critically important to ensure that the customer applications are not impacted during any carrier network failures. In fact, network availability is often a part of the Service Level Agreement (SLA) between a carrier and its customers. For example, a common benchmark restoration speed is sub-50 ms; that is, the customer traffic should be re-routed within 50 ms of any network node or link failure. Traditional approaches have not been successful at achieving these restoration speeds, resulting in degraded or halted communication services. The development of new network recovery schemes has the additional challenge of maintaining compatibility and interoperability with existing protocols, as an overhaul of current mechanisms would be both expensive and limited in deployment.

Therefore, there is a need for an approach to network restoration that can satisfy requirements for rapid recovery and ensure interoperability with current protocols.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for enhancing loop-free alternate (LFA) coverage are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to networks that carry data packets using Multi-protocol Label Switching (MPLS) technology, it is contemplated that various exemplary embodiments are applicable to other equivalent systems and traffic flows.

Figure 1:
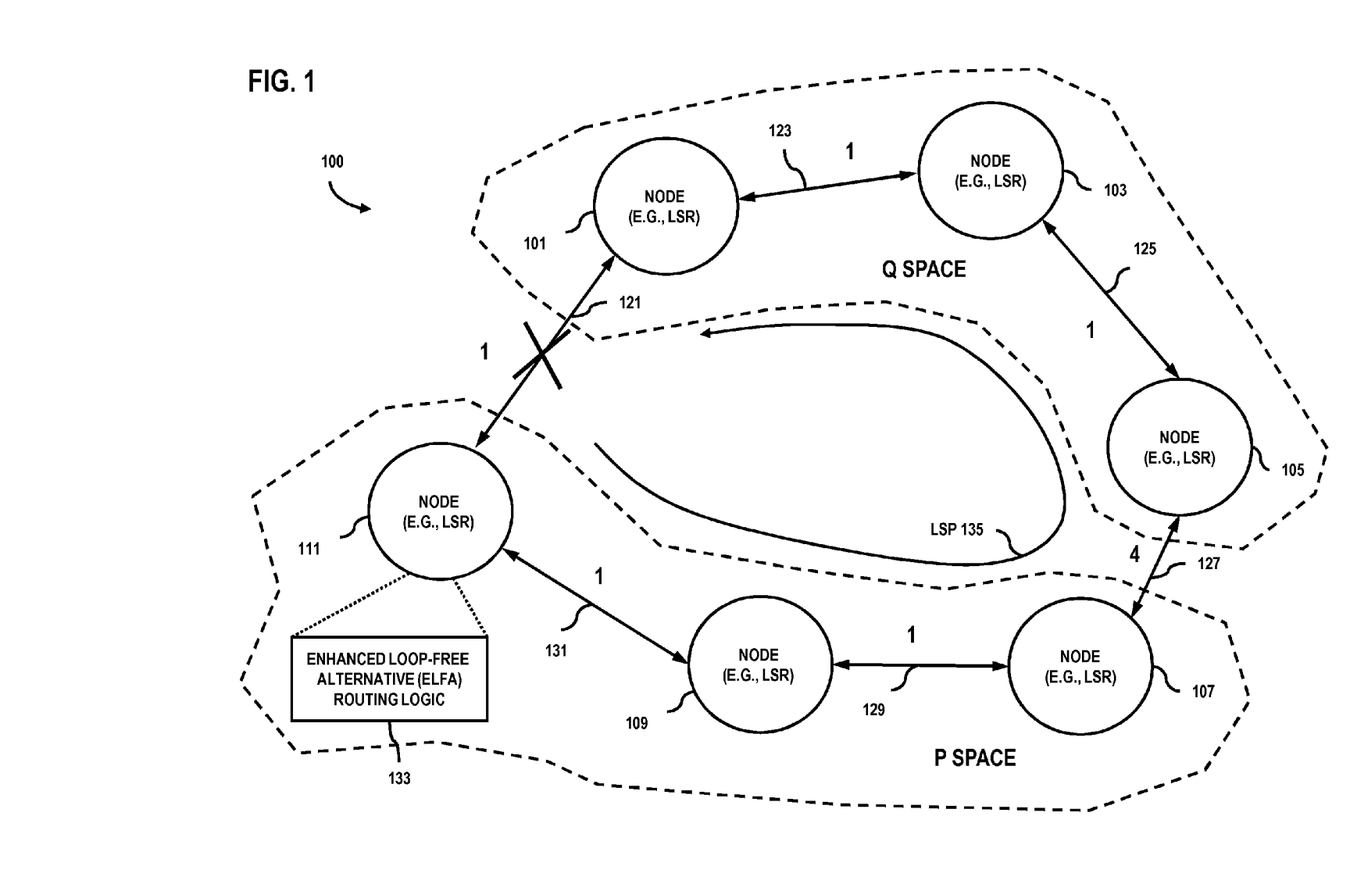
FIG. 1 is a diagram of a network experiencing link failure, whereby an enhanced Loop-Free Alternate (LFA) procedure can be executed to provide network recovery, according to an exemplary embodiment.

FIG. 1 is a diagram of a network experiencing link failure, whereby an enhanced Loop-Free Alternate (LFA) procedure can be executed to provide network recovery, according to an exemplary embodiment. It is recognized that nodes in a network need to be rapidly notified of failures or changes in conditions/states so that redundancies (if any) built into the network can be immediately activated and service restored to the users (e.g., customers). For the purposes of illustration, a communication system 100 for providing Enhanced Loop-Free Alternate (ELFA) routing is described. In particular, certain embodiments are explained in the context of Multi-protocol Label Switching (MPLS) technology. This technology is based on setting up virtual paths between communication nodes (e.g., routers) in a network. MPLS provides high speed transfer of packets over data networks by appending labels to packets that contain information related to the path that the data packet will take to reach its destination. The use of such labels eliminates the need for routers to examine the header of each packet, resulting in the faster delivery of packets to their destination. The details on MPLS technology is further described in Internet Engineering Task Force (IETF) Request for Comment (RFC) 3031, which is incorporated herein in its entirety. Even though various technologies such as MPLS predominantly support fast delivery of packets, the characteristics and construction of the physical network infrastructure plays an equally vital role.

Moreover, it is recognized that multi-protocol label switching (MPLS) traffic engineering (TE) has been developed to provide network administrators with the ability to control and manipulate the flow of traffic through a network. MPLS-TE utilizes label switching techniques to construct label switched paths (LSP), label distribution protocol (LDP) flows, and fast re-route (FRR) tunnels on one or more links interconnecting nodes of one or more networks (or autonomous systems). Routing protocols, such as open-shortest path first (OSPF) and intermediate system to intermediate system (IS-IS), are utilized to determine MPLS traffic flow routes through the network, as well as govern the distribution of routing information between nodes of the network(s).

When a node (e.g., router) or link connecting the node to another node fails within a network, the network topology effectively changes. Consequently, the routers need to update their routing tables to establish alternative routes to the destination. This "convergence" process requires time for updating the network elements of the topological change, which can be substantial in some cases. Loop-Free Alternative (LFA) has developed as a technology that can support Fast Restoration and Reroute (FRR) to Label Distribution Protocols (LDP). The details of LFA are provided in RFC 5285, which is incorporated herein by reference in its entirety.

LFA can be an effective technology; however, its coverage, as standardized, is highly dependent on the network physical topology. Various industry studies have determined the average coverage to be at around 60%. That is, 40% of the network elements cannot be protected by LFA. Hence, the effectiveness of LFA is severely undermined.

One approach is to employ the so-called "P/Q method," which is detailed in an IETF draft entitled, "IP Fast Reroute Using Tunnels" (Nov. 16, 2007); which is incorporated by reference in its entirety.

In certain embodiments, system 100 includes one more communication nodes 101-111 configured to communicate directly or indirectly with each other, operating as Label Switching Routers (LSRs). As shown, a source node 111 can generate traffic as label distribution protocol (LDP) flows to a destination node 101. Source node 101 can be situated in the middle or core of the network 100, or at the edge. Typically, although not necessarily, in the scenario to be described, both nodes 101 and 103 are edge label switching routers (ELSRs), and reside in geographically remote areas. Under this scenario, traffic from source node 111 to destination node 101 can traverse one or more nodes (or network elements) comprising a routing network.

In this example, nodes 101, 103, and 105 are considered within the Q-Space and nodes 107-111 are within the P-Space. The P/Q Method can provide significant coverage improvement, up to 98% in some cases; however, this is still short of complete, 100% coverage. Under the scenario of FIG. 1, there is no overlapping of P-Space and Q-Space. In this example, once link 121 fails, traffic would not be able to fast re-route from node 111 to node 101.

As shown, node 101 supports link 123 to node 103, which communicates with node 105 through link 125. Link 127 provides connectivity to node 107. Also, node 107 utilizes link 129 to node 109, which is connected to node 111 via link 131.

By way of example, an enhanced loop-free alternative routing logic 133 is employed within one or more of the nodes of system 100 to enable a greater LFA coverage area.

In one embodiment, the use of loop-free alternates provide local protection for unicast traffic in pure Internet Protocol (IP) and MPLS/LDP networks in the event of a single failure (whether link, node, or shared risk link group (SRLG)). This enhanced loop-free alternative approach can reduce the packet loss that can occur while routers converge after a topology change stemming from the failure. Rapid failure repair is achieved through use of pre-calculated backup next-hops that are loop-free until the distributed network convergence process completes. This enhanced LFA approach does not require any support from other routers.

According to certain embodiments, each router forwards MPLS packets to its immediate nodes or next-hops depending on its packets' labels. For example, for packets destined to node 101, node 111 forwards the packets to intermediate nodes (e.g., nodes 109, 107, 105, and 103) that are part of a Label Switched Path 133 (LSP) from node 111 to 101. This path typically is comprised of different sub-paths or segments, wherein each of the paths can correspond to physical links between the corresponding nodes. Such links can be bi-directional, while the logical paths are typically unidirectional. It is noted that the terms "path" and "link" are generally used interchangeably, unless a particular distinction between them is specified. Under normal circumstances (e.g., when all the nodes and associated links are active and functioning properly) the path LSP 135 is typically pre-calculated based on shortest paths algorithms by determining a path from node 111 to 101 with minimum associated transmission cost, for example. In this example, costs of links 121, 123, 125, 129, and 131 are 1, while link 127 has a cost of 4. The cost can be based on any one or number of metrics (or factors) such as the time to travel, actual leasing expenses, bandwidth, etc.

It is contemplated that other arrangements or topologies may be utilized by system 100. Furthermore, the links such as 123, 125, 127, 129, and 131 may include both wired (e.g., coaxial cable, twisted pair, fiber optic cable, etc.) as well as wireless connections.

As mentioned, each of the nodes, in particular, router 111 might include an enhanced Loop-Free Alternate (LFA) routing logic 133, which enables a node to re-route its packets to alternate routes in the case there is failure on the paths of its forwarded packets.

Figure 2:
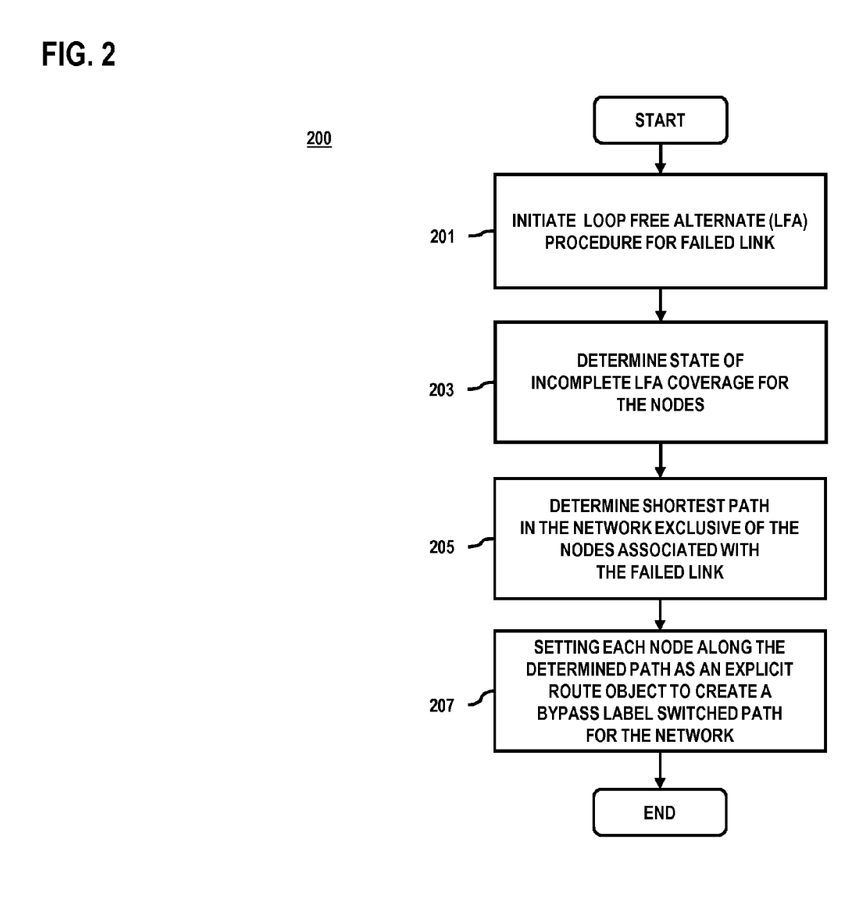
FIG. 2 is a flowchart of a process for enhancing loop-free alternate coverage, according to one embodiment.

FIG. 2 is a flowchart of a process for enhancing loop-free alternate coverage, according to one embodiment. Process 200, per step 201, initiates a loop-free alternate (LFA) procedure for a failed link (e.g., link 121 of system 100) of a network that includes multiple nodes (e.g., nodes 101-111). As seen in FIG. 1, with the failure of link 121, source node 111 cannot forward packets destined for destination node 101. Typically, through different means (e.g., network management system (not shown)), source node 111 as well as other nodes within system 100 may become aware of the failure of the link 121. Upon acquiring such knowledge, the nodes 101-111 can re-calculate the routes and update their routing tables accordingly. This process requires a certain amount of time to complete; but, during this convergence, it is important to maintain the traffic flow with minimum interruption. By way of example, the Loop-Free Alternate (LFA) routing algorithm can be utilized to ensure the flow of packets from source node 111 are not lost during this time, as system 100 is learning the new topology. To avoid link 121 being included in the new alternate route, the LFA scheme is executed.

Node 111, as an LSR, attempts to build LFA protective link 121 following the standard LFA process and P/Q process. However, both attempts result in failure to establish such protective link.

At this point, the enhanced LFA routing logic 133 can execute process 200, in part or in its entirety. It is contemplated that one or more of the nodes in system 100 can be configured with enhanced LFA logic 133.

Next, a determination is made of a state of incomplete loop-free alternate coverage for the nodes 101-111 (step 203). Process 200, as is step 205, then determines a shortest path in the network 100 exclusive of the nodes associated with the failed link 121; that is, the nodes in the scenario of FIG. 1 are nodes 101 and 111. For instance, router 111 runs, e.g., Dijkstra's algorithm (or Modified Dijkstra's algorithm) to find the shortest path (or near shortest path) without using link 121.

In step 207, each node along the determined shortest path is set as an explicit route object (ERO) to create a bypass label switched path for the network 100. That is, upon the completion of the path identification process, the path setting message is generated. Every router interface along the path is set as an ERO.

Figure 3:
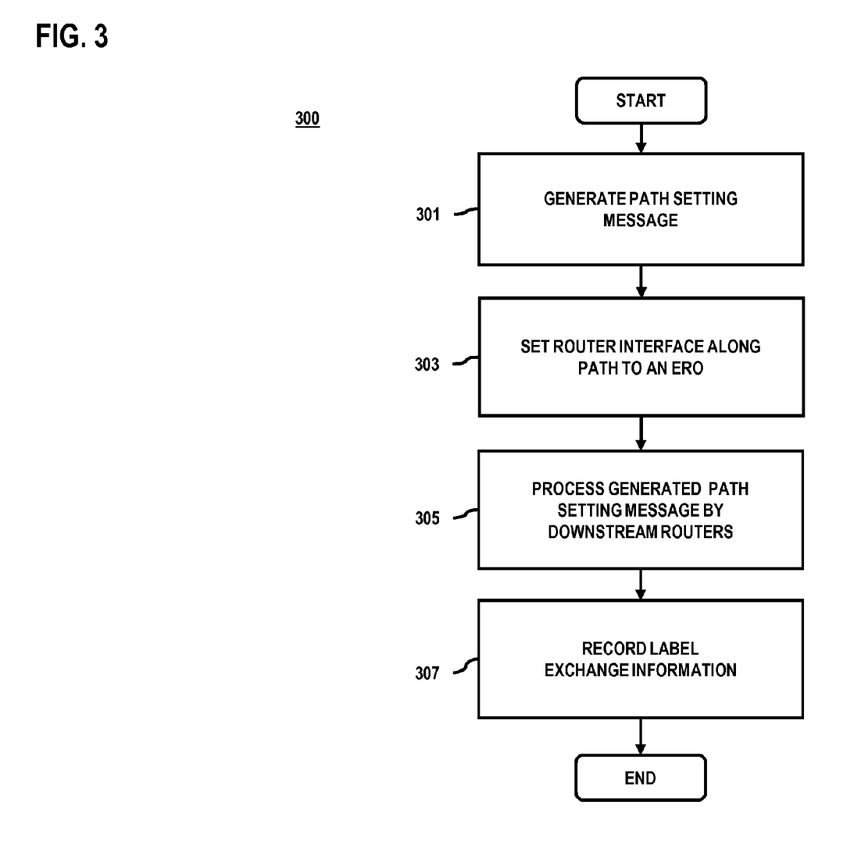
FIG. 3 is a flowchart of a process for setting router interfaces in the process of FIG. 2, according to one embodiment.

FIG. 3 is a flowchart of a process for setting router interfaces in the process of FIG. 2, according to one embodiment. Specifically, process 300 involves generating a path setting message, per step 301. In step 303, communication interfaces (e.g., router interface) of the appropriate nodes along the determined path of network 100 are set accordingly—e.g., set to the ERO. It is recognized that an additional enhancement can be made to an existing MPLS function of the so-called Explicit Route Object (ERO). In this manner, a simple protocol can be used to establish a bypass tunnel (LSP) using ERO. This mechanism can be invoked, in certain embodiments, when full LFA coverage cannot be found using the standard LFA procedure and the P/Q mechanism. In step 305, downstream nodes (e.g., routers) can process the received path setting message. The label exchange information is then recorded, as in step 307. The details of LFA-ERO protocol are further provided with respect to FIG. 4.

Figure 4:
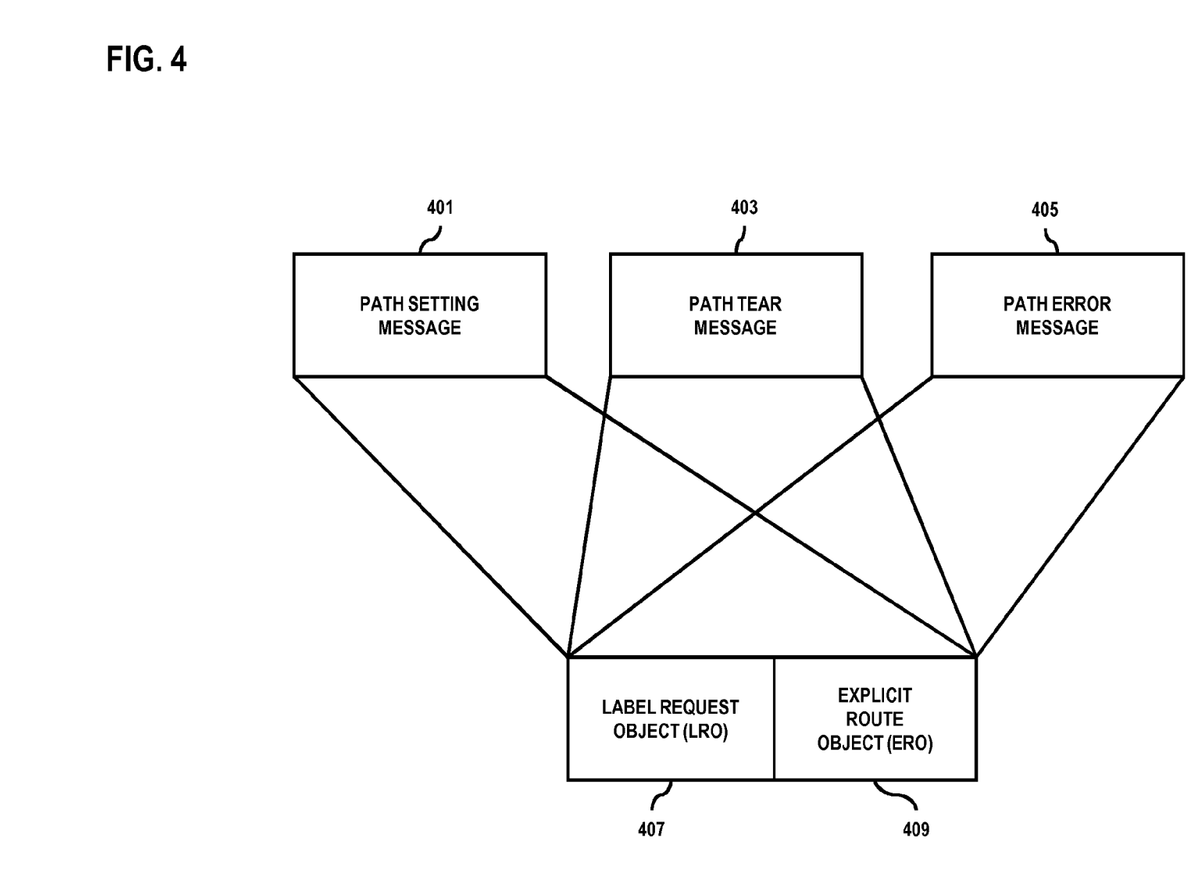
FIG. 4 is a diagram of messages for establishing and tearing down a bypass tunnel, according to an exemplary embodiment.

FIG. 4 is a diagram of messages for establishing and tearing down a bypass tunnel, according to an exemplary embodiment. Under the LFA-ERO protocol, in certain embodiments, three types of messages can be employed in the network recovery and restoration process: path setting message 401, path tear message 403, and path error message 405. As shown, these messages 401-405 utilize the following objects: a label request object (LRO) 407 and an explicit route object (ERO) 409. Label request object (LRO) 407 is used to request label binding, while ERO 409 provides, e.g., a list of router slot interface(s) to visit.

In some embodiments, the path setting message 401 can be sent by an ingress node to request creation of a bypass LSP. The path setting message 401 specifies a destination address for the egress node, and is also processed by all intermediate nodes along the requested path.

The path tear message 403 can be generated to tear down the bypass LSP (e.g., LSP 135). Also, dependent reservation state information from the nodes that receive the message is deleted.

Further, the path error message 405 provides reporting of an error of the path either in path establishment/tear down process or during the operation of the path. It is noted that the path tear-down and path error process can follow the current standard path tear down and error process.

Figure 5:
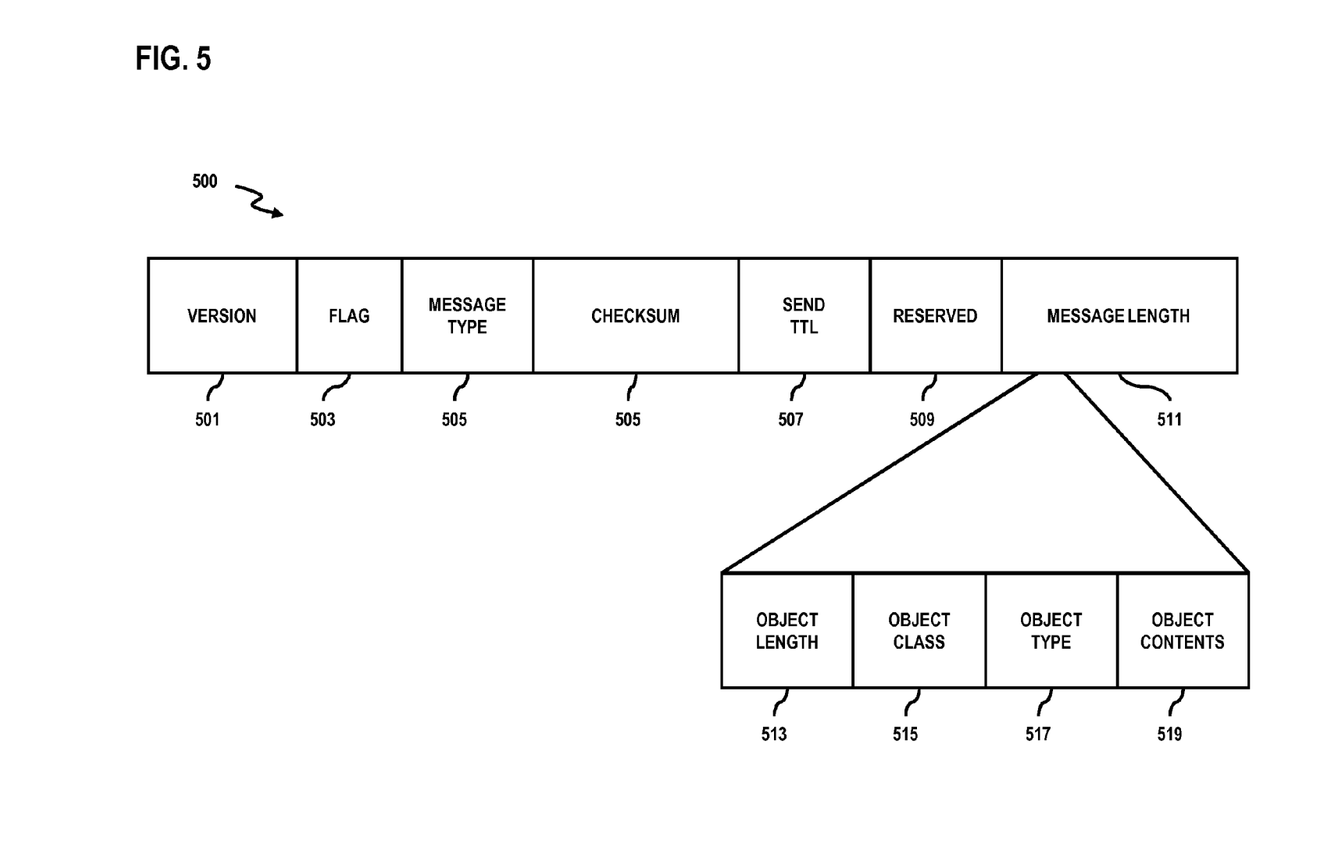
FIG. 5 is a diagram of a message format utilized in a Loop-Free Alternative (LFA)-Explicit Route Object (ERO) protocol to establish a bypass tunnel, according to an exemplary embodiment.

FIG. 5 is a diagram of a message format utilized in a Loop-Free Alternative (LFA)-Explicit Route Object (ERO) protocol to establish a bypass tunnel, according to an exemplary embodiment. Message format 500 can be utilized for the three types of messages 401-405 of FIG. 4. In certain embodiments, message 500 includes a version field 501, a flag field 503, a message type field 505, and a checksum field 507. Also, message 500 specifies a send time-to-live (TTL) field 507, a reserved field 509, and a message length field 511. Further, the message length field 511 can specify the following object information: object length field 513, object class field 515, object type field 517, and object contents field 519.

By way of example, the message format 500 can provide the following field lengths, per Table 1:

TABLE 1

| Field Name | Field Length |
| --- | --- |
| Version | 4 bits |
| Flag | 4 bits |
| Message Type | 1 byte |
| Checksum | 2 bytes |
| Send TTL | 1 byte |
| Reserved | 1 byte |
| Message Length | 2 bytes |
| Object Length | 2 bytes |
| Object Class | 1 byte |
| Object Type | 1 byte |
| Object Contents | Variable |

It is contemplated that other formats may be utilized to provide an LFA scheme for complete LFA coverage.

Figure 6:
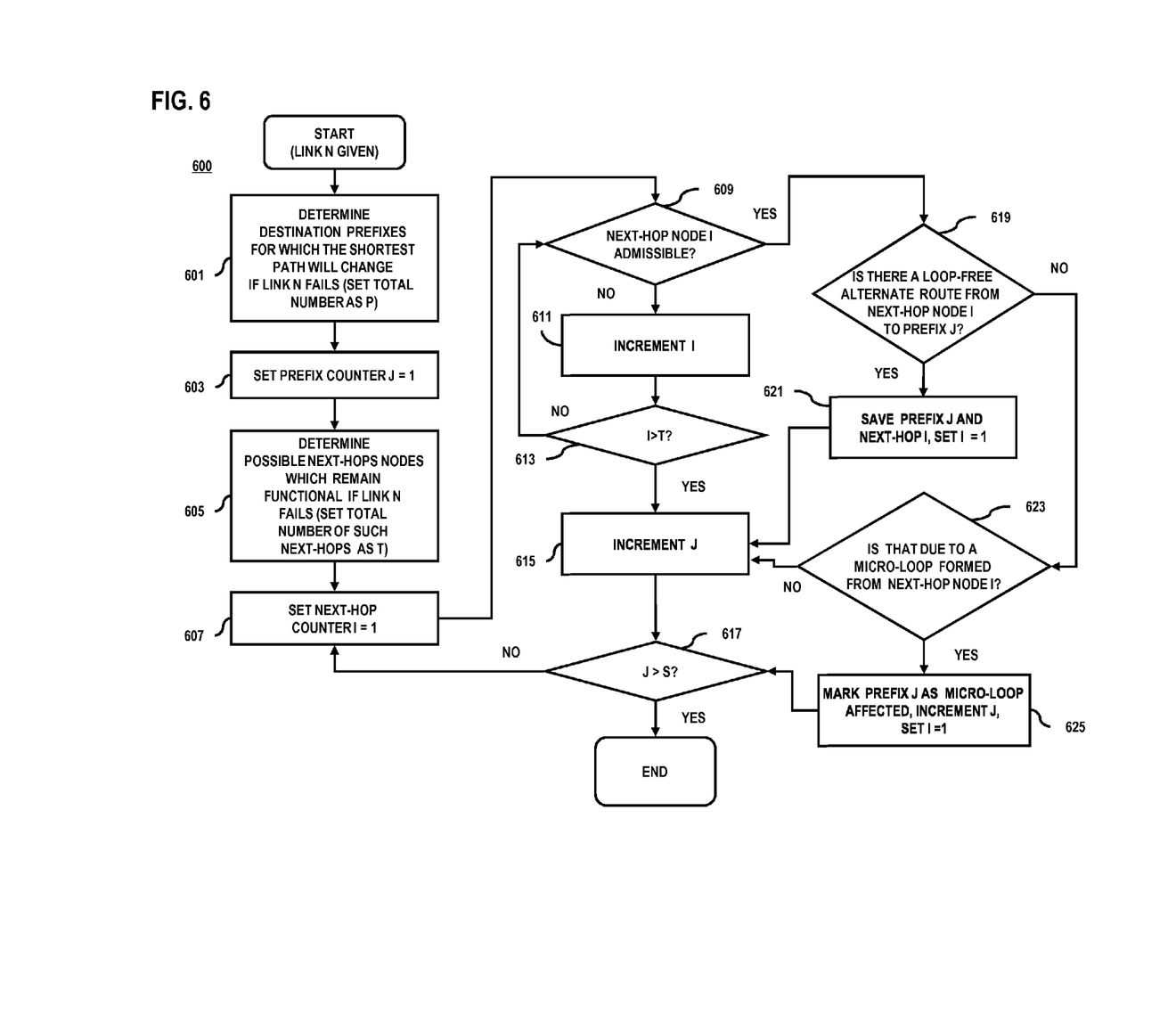
FIG. 6 is a flowchart for a basic Loop-Free Alternate (LFA) routing procedure that can be utilized with the enhanced LFA process of FIG. 2.

FIG. 6 is a flowchart for a basic Loop-Free Alternate (LFA) routing procedure that can be utilized with the enhanced LFA process of FIG. 2. For illustrative purposes, the LFA procedure is explained with respect to the mechanism defined in RFC 5286. In certain embodiments, this basic LFA procedure can be executed by any node of the network 100. An outward link (with respect to the calculating source node 111) is given as an input to process 600. Such link can be denoted as Link N. The process 600 attempts to find an LFA route to any destination prefix for which the normal optimal shortest path from the calculating node passes through Link N. This path can be affected by either the failure of Link N or the node it corresponds to. In step 601, one or more (e.g., all) destination prefixes for which the shortest path will change if Link N fails, are determined. The total number of such prefixes is set as P. The prefix counter J is initialized (e.g., set to 1), as in step 603.

In step 605, the process 600 determines one or more possible next-hops (with respect to the calculating node) which remain functional if Link N fails. The total number of such next-hops is denoted by T. In step 607, the next-hop counter I is initialized to I=1. In step 609, the process 600 checks whether the particular next-hop is admissible. In this step various issues about the Next-Hop I could be checked; for example, if there is an administratively allowed route to the corresponding node or if the cost to transmit to the node satisfies a predetermined threshold value (e.g., cost exceeds a certain amount). If the Next-Hop I is not admissible, then in step 611, next-hop counter I is incremented; and in step 613, the process determines whether I is larger than T, the total number of Next-Hops. If I>T, then in step 615, J is incremented per step 615, otherwise the procedure returns to step 609. In step 617, the process determines whether J>P; in which case the procedure stops, otherwise the process 600 returns to step 607.

In step 619, the process 600 checks whether there exists an LFA to the prefix J wherein the LFA uses Next-Hop I. Any variety of approaches can be utilized to perform this check. One approach is to determine whether the (optimal) transmission cost from Next-Hop I to Prefix J is less than the sum of the (optimal) cost from Next-Hop I (back) to the calculating node and the (optimal) cost from the calculating node to the destination Prefix J. If this condition is satisfied, a loop-free alternate route from the calculating node to the Prefix J exists, and such a node could be used, at least, in case the Link N fails. In fact, such a route can be used when the node associated with Link N also fails. Upon finding such a route, in step 621 the Prefix J and Next-Hop I are saved for later use and Next-Hop counter I is initialized to 1 again, and the procedure goes back to step 615.

In case no LFA could be found in step 623, it is determined whether this is due to existence of a micro-loop from Next-Hop I back to the calculating source node. This determination could be made for example based on whether there is a next-hop to Next-Hop node I (such as Q) from which the cost to destination Prefix J is less than the sum of the cost from Q to the calculating source node and from the calculating source node to the destination Prefix J. If that is the case, then in step 625, the Prefix J and Next-Hop node I are marked as micro-loop affected; and consistent with the process of FIG. 6, this information is be used to implement the enhanced LFA logic 133. If such a micro-loop does not exist then the procedure returns to step 617. A micro-loop can exist, whereby a re-routed packet might return to the source node; it is termed "micro" because it is the smallest possible loop. LFA technologies can be rendered inapplicable to the particular network, or at best, reduce the LFA coverage area. Commonly assigned pending application, entitled "System and Method for Fast Network Restoration," Ser. No. 12/869,440, filed Aug. 26, 2010 (which is incorporated herein in its entirety), provides a scheme to address these micro-loops.

As mentioned, the above process 600 does not result in complete LFA coverage, in part, because it is recognized that LFA in its current form does not adequately address certain network topologies.

The above processes and arrangements, according to certain embodiments, advantageously enable rapid restoration of network failures by extending the LFA scheme.

The processes described herein for providing an enhanced LFA scheme for network recovery may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
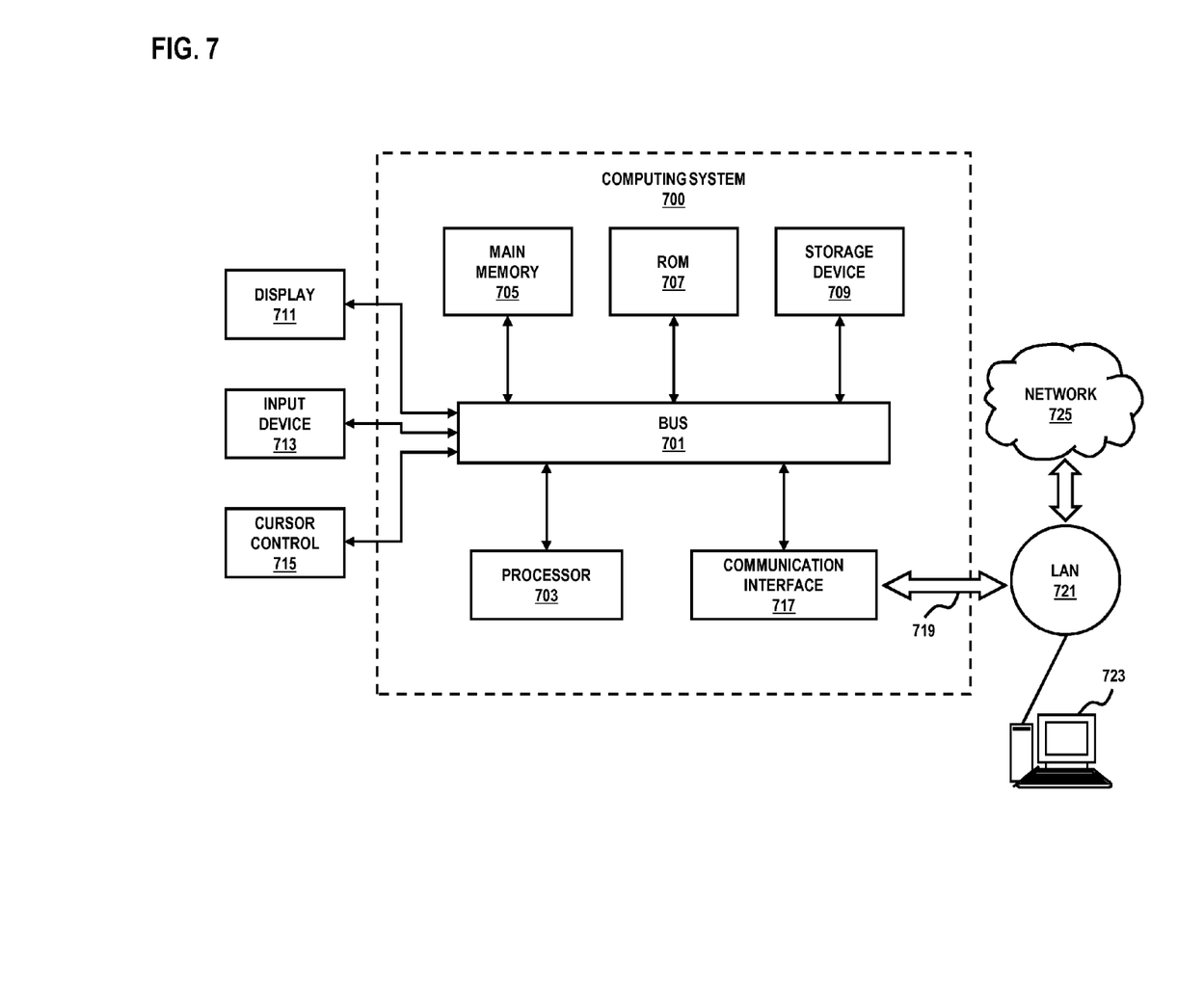
FIG. 7 is a diagram of a computer system that can be used to implement various exemplary embodiments.

FIG. 7 illustrates computing hardware (e.g., computer system) 700 upon which exemplary embodiments can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an exemplary embodiment, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement exemplary embodiments. Thus, exemplary embodiments are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an exemplary embodiment through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
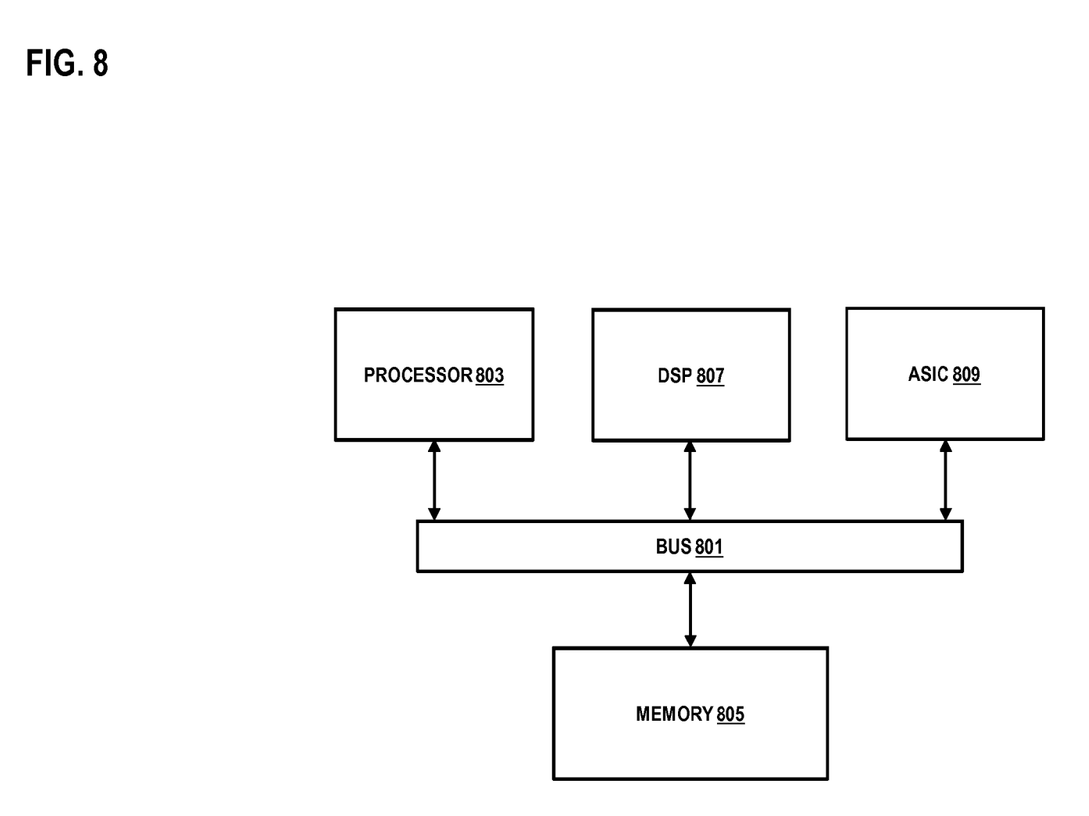
FIG. 8 is a diagram of a chip set that can be used to implement various exemplary embodiments.

FIG. 8 illustrates a chip set 800 upon which an embodiment of the invention may be implemented. Chip set 800 is programmed to present a slideshow as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of FIGS. 2, 3A-3C, and 6B.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to providing notification of a change in path condition. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:

initiating by an apparatus an enhanced loop-free alternate (LFA) procedure for a failed link of a network including a plurality of nodes, after at least one failed attempt to establish an LFA coverage using a standard LFA procedure and at least one failed attempt to establish the LFA coverage using a P-space and Q-space (P/Q) procedure;

determining by the apparatus a state of incomplete loop-free alternate coverage for the nodes;

determining by the apparatus a shortest path in the network exclusive of the nodes associated with the failed link;

upon determining the shortest path, generating by the apparatus a path setting message to set interfaces of the nodes along the shortest path, wherein the path setting message is generated according to an explicit route object function of a multiple protocol label switching (MPLS) protocol; and setting by the apparatus each node along the determined shortest path as an explicit route object to create a bypass label switched path for the network, wherein there is no overlapping of P-Space and Q-Space for the nodes, and the enhanced loop-free alternate procedure includes a subsequent standard loop-free alternate procedure and a subsequent P-space and Q-space (P/Q) procedure.

2. A method according to claim 1, further comprising:
recording label exchange information for the nodes of the bypass label switched path.

3. A method according to claim 1, further comprising:
generating a path tear message to tear down the bypass label switched path.

4. A method according to claim 1, wherein the nodes include multiple protocol label switching (MPLS) nodes.

5. An apparatus comprising:
at least one processor; and
at least one memory including computer program code for one or more programs,
the at least one memory and the computer program code configured to, with the at least one processor, cause the apparatus to perform at least the following,
initiate an enhanced loop-free alternate (LFA) procedure for a failed link of a network including a plurality of nodes, after at least one failed attempt to establish an LFA coverage using a standard LFA procedure and at least one failed attempt to establish the LFA coverage using a P-space and Q-space (P/Q) procedure;
determine a state of incomplete loop-free alternate coverage for the nodes;
determine a shortest path in the network exclusive of the nodes associated with the failed link;
upon determining the shortest path, generate a path setting message to set interfaces of the nodes along the shortest path, wherein the path setting message is generated according to an explicit route object function of a multiple protocol label switching (MPLS) protocol; and set each node along the determined shortest path as an explicit route object to create a bypass label switched path for the network, wherein there is no overlapping of P-Space and Q-Space for the nodes, and the enhanced loop-free alternate procedure includes a subsequent standard loop-free alternate procedure and a subsequent P-space and Q-space (P/Q) procedure.

6. An apparatus according to claim 5, wherein the apparatus is further caused to: generate a path setting message to set interfaces of the nodes along the shortest path.

7. An apparatus according to claim 5, wherein the apparatus is further caused to: record label exchange information for the nodes of the bypass label switched path.

8. An apparatus according to claim 5, wherein the apparatus is further caused to: generate a path tear message to tear down the bypass label switched path.

9. An apparatus according to claim 5, wherein the nodes include multiple protocol label switching (MPLS) nodes.

10. A system comprising:
a plurality of multiple protocol label switching (MPLS) nodes configured to communicate with one another,
wherein at least one of the MPLS node is configured to:
initiate an enhanced loop-free alternate (LFA) procedure for a failed link of a network including a plurality of nodes, after at least one failed attempt to establish an LFA coverage using a standard LFA procedure and at least one failed attempt to establish the LFA coverage using a P-space and Q-space (P/Q) procedure,
determine a state of incomplete loop-free alternate coverage for the nodes, to determine a shortest path in the network exclusive of the nodes associated with the failed link,
upon determining the shortest path, generate a path setting message to set interfaces of the nodes along the shortest path, wherein the path setting message is generated according to an explicit route object function of a multiple protocol label switching (MPLS) protocol, and
set each node along the determined shortest path as an explicit route object to create a bypass label switched path for the network,
wherein there is no overlapping of P-Space and Q-Space for the nodes, and the enhanced loop-free alternate procedure includes a subsequent standard loop-free alternate procedure and a subsequent P-space and Q-space (P/Q) procedure.

11. A system according to claim 10, wherein the MPLS node is configured to generate a path setting message to set interfaces of the nodes along the shortest path.

12. A system according to claim 11, wherein the path setting message is generated according to an explicit route object function.

13. A system according to claim 10, wherein the MPLS node is configured to record label exchange information for the nodes of the bypass label switched path.

14. A system according to claim 10, wherein the MPLS node is configured to generate a path tear message to tear down the bypass label switched path.

* * * * *